United States Patent [19]

Sauer

[11] Patent Number: 4,618,932
[45] Date of Patent: Oct. 21, 1986

[54] CONTROL DEVICE FOR AT LEAST TWO CIRCULATING SHELVING SYSTEMS

[75] Inventor: Hans-Peter Sauer, Bellheim, Fed. Rep. of Germany

[73] Assignee: Bellheimer Metallwerk GmbH, Bellheim, Fed. Rep. of Germany

[21] Appl. No.: 593,823

[22] Filed: Mar. 27, 1984

[30] Foreign Application Priority Data

Apr. 9, 1983 [DE] Fed. Rep. of Germany ....... 3312777

[51] Int. Cl.[4] ............................................ G06F 15/46
[52] U.S. Cl. .................................... 364/478; 364/138;
198/340; 198/341; 198/356; 198/575; 211/121;
312/97; 312/134; 312/268; 340/825.57; 370/29;
455/603
[58] Field of Search .................. 211/121; 312/97, 134,
312/268; 198/340, 341, 356, 358, 575, 798;
414/134, 136; 340/825.57, 825.72; 370/29;
455/603, 602, 613; 364/138, 468, 478

[56] References Cited

U.S. PATENT DOCUMENTS

| | | |
|---|---|---|
| 3,510,841 | 6/1970 | Lejon ............................. 340/825.57 |
| 3,541,257 | 11/1970 | McCormick et al. .......... 340/825.57 |
| 4,117,459 | 9/1978 | Douglas et al. ................ 340/147 R |
| 4,240,148 | 12/1980 | Thoma ............................... 364/478 |
| 4,304,001 | 12/1981 | Cope .................................. 364/138 |
| 4,484,288 | 11/1984 | Riemenschneider ............... 312/268 |
| 4,484,289 | 11/1984 | Hemond ............................. 198/358 |
| 4,498,196 | 2/1985 | Holoyda et al. .................... 455/603 |

Primary Examiner—Jerry Smith
Assistant Examiner—John R. Lastova
Attorney, Agent, or Firm—F. Eugene Davis, IV; Mark P. Stone

[57] ABSTRACT

In facilities having several systems of circulating shelving, because of the multiplicity of parts to be stored the regular use of a data processing system is required. For controlling the systems of circulating shelving by means of the data processing system, suitable control arrangements are used. In such a control arrangement, the signal output (51) of a data station (33) is coupled via an optical coupler (62) to a transmit line (38). The transmit line (38) connects in parallel all similar connections of the data stations of several control arrangements, allowing the interposition of a multiplexer to be dispensed with.

12 Claims, 3 Drawing Figures

CONTROL DEVICE FOR AT LEAST TWO CIRCULATING SHELVING SYSTEMS

BACKGROUND OF THE INVENTION

The invention relates to a control arrangement for a system of circulating shelving which, in conjunction with at least one other system of circulating shelving provided with an identical control arrangement, is controllable by a data processing system and is provided with storage places for stored goods in the form of a multiplicity of carriers moveable by a drive system, the control arrangement being allocated a first device for detecting the position of the carriers, a second device for detecting the occupancy of the storage places and a data station provided with a data terminal and a data transmission device, the data station being connectable via a receive line, a transmit line and a return line to the data station of the control arrangement of the other system of circulating shelving and to a data station of the data processing system, with the receive line connected to a signal input of the data terminal, the transmit line to a signal output of the data transmission device and the return line to the system earth of the data station.

Control arrangements of this type are primarily used in large facilities having several systems of circulating shelving such as are described, for example, in the journal "Distribution", Volume 1-2/1983, pages 16 and 17.

In small systems of circulating shelving, a relatively simple collating system (file cards) is sufficient to know the place to which a certain item of stored goods is allocated. The drive system can then be manually set in motion until the desired carrier is in front of the service table. In large facilities, however, the support of a data processing system cannot be dispensed with. Each part to be stored is provided with an identification number and by entering this identification number into an input unit, information is obtained from the data processing system on where the relevant part is located or to where it must be brought. Each system of circulating shelving must therefore be allocated a control arrangement which contains a data station which then analyses and displays the information supplied by the data processing system and causes the drive system to move the identified carrier in front of a service table. In some systems, the issuing or receiving of stored goods can even be performed automatically. At the least, however, the data station contains a display unit which shows at which position the desired item of stored goods can be found. This can be, for example, coordinate data or a display strip reaching along the entire length of the service table.

Certain terms are defined in standards. Thus, for example, DIN 44 302 states that a data station consists of a data terminal and a data transmission device. The data terminal essentially comprises input, output, arithmetic and control units and memories. Inside the data terminal, the digital data are transferred in such a manner that binary elements, from which a character is composed, are in each case simultaneously transferred via a corresponding number of interface lines. In 8-bit technology, for example, parallel transfer accordingly takes place via eight interface lines. The data transmission device essentially has the task of establishing a connection with another data station which requires much less expenditure in lines. For this purpose, the digital data are transmitted in such a manner that the binary elements of which a character is composed are successively transferred via an interface line. This refers in each case to one direction of transmission. For an interactive connection, therefore, a transmit line and a receive line and a common return line are needed.

A data processing system is connected to a control arrangement of the type described in such a manner that three lines are run between the data station of the control arrangement and the corresponding data station of the data processing system. However, if several control arrangements are to be connected to one data processing system, a multiplexer has to be interposed. Such an additional device causes a considerable increase in cost, of an order of magnitude of about DM 30,000.00. To this is added greater installation and mounting expenditure and an increase in susceptibility to interference.

SUMMARY OF THE INVENTION

The object of the invention is to create a control arrangement, of the type being considered, which can be connected to another control arrangement and/or a data processing system and which is cost-effective, requires little mounting and installation effort and little space and which is characterised by low heat development with low power consumption. In addition, it should be operationally reliable and have low susceptibility to interference.

In a control arrangement of the type initially described, this object is achieved when the signal output of the data transmission device drives a transistor which is operated in an emitter circuit with a high-resistance voltage path and that the transmit line is connected to the emitter of the transistor.

Driving a transistor in the specified manner by the signal output allows all connections equipped in a corresponding manner of several data transmission devices to be connected in parallel. Interposition of an expensive multiplexer is thus no longer necessary and the mounting and installation effort involved in the interposition and the space requirement, the power consumption and the heat development do not arise. Above all, the operational reliability is considerably increased and susceptibility to interference significantly reduced. This results from the fact that a multiple signal conversion, such as is needed when using a multiplexer, is no longer necessary. The number of transfer points and interfaces is also drastically reduced.

If in the interconnection of several control arrangements, messages or requests are to be directed to a central processing system in each case via associated input units (for example input keyboard), the data station must be provided with a busy signal connection which is advantageously designed in accordance with the features of claim 4. The busy-signal connections, connected in parallel via the record line, ensure that data are always transferred to the transmit line by only one data transmission device. The form specified permits a parallel connection without interposing a multiplexer.

In claims 7 and 10, respectively, a particularly suitable breakdown and layout of the most important circuit elements of the control arrangement are specified. Depending on the development stage of a system, a third circuit board can be inserted which either has the design specified in claim 1 of a data transmission device or on which the circuit elements required for this are missing. Thus, control arrangements which are initially provided only for being connected to a data processing system by themselves can at any time be rapidly and simply refitted simply by exchanging the third circuit board for a corresponding expanded circuit board. By this simple measure, this control arrangement can be operated in parallel with control arrangements which are correspondingly equipped in the same manner. The control arrangement comprises in a compact and clear arrangement all necessary circuit elements including the input unit and the display unit.

In the text which follows, the invention is explained with the aid of an especially preferred illustrative embodiment as shown in the drawing, in which:

DETAILED DESCRIPTION OF THE PREFERRED EMBODIMENTS

Figure 1:
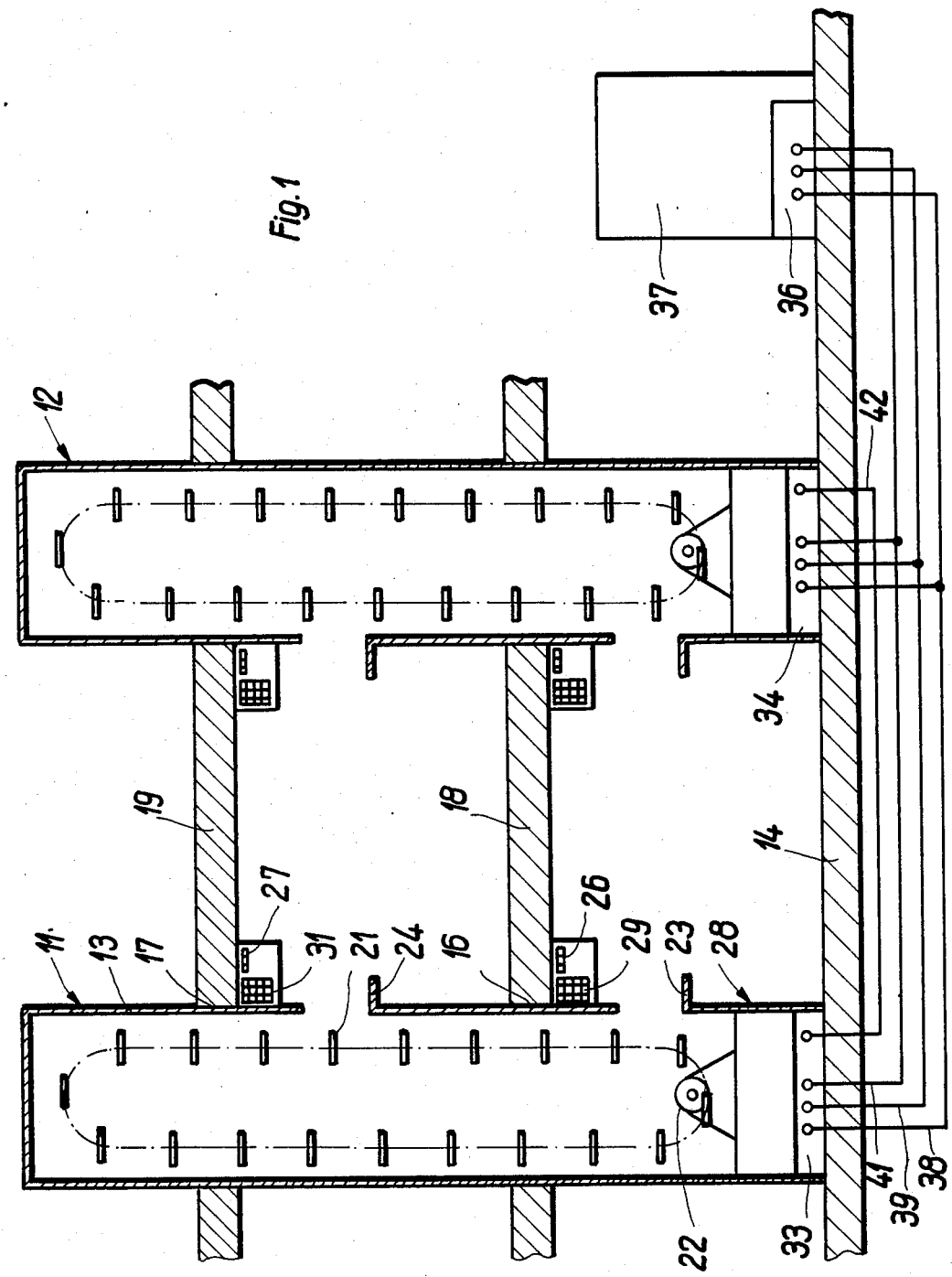
FIG. 1 shows an arrangement of two systems of circulating shelving having control arrangements according to the invention, connected together with a data processing system in a diagrammatically greatly simplified representation.

In FIG. 1, two systems of circulating shelving 11 and 12 are indicated in a diagrammatically greatly simplified manner. Both systems of circulating shelving are of identical construction and for this reason only the system of circulating shelving 11 is explained in greater detail as being representative of both. The construction of a system of circulating shelving is known per se and, therefore, the most essential elements will be considered only for the sake of completeness. Accordingly, the system of circulating shelving 11 essentially consists of a housing 13 which is situated on a foundation 14 and extends over several stories of a building, projecting through ceiling openings 16 and 17 in ceilings 18 and 19. In the interior of the housing 13, several carriers 21 are held to be moveable. The carriers 21 are constructed in accordance with the type of stored goods to be held by them. A drive system 22, which comprises for example a motor and a drive chain, is used for moving a respective required carrier 21 in front of a service table 23 or 24. Not shown is a loading/unloading system which moves an item of stored goods from the service table to a predeterminable space on a carrier or conveys it from there on to the service table. Such systems are known per se and are not usable with every type of stored goods. A position indicator 26 and 27 can be considered as if it were a component of such a system and provides a visual indication of at least the position of a predetermined item of stored goods. For reasons of better clarity, a control arrangement 28 is diagrammatically indicated in the lower part of the housing 13 in the drawing. This control arrangement 28 comprises essentially a device, not specially illustrated and known per se, for detecting the position of each carrier 21 and a second device for detecting the occupancy of the space on the carriers. This detection can take place either automatically by suitable sensor mechanisms or by an operator entering information on a keyboard 29, 31. The control arrangement 28 also contains a data station 33 which, in turn, consists of a data terminal and a data transmission device. These are units which are very well known from data processing. From the data station 33, a transmit line 38 leads in parallel to similar connections of a data station 34 of the second system of circulating shelving 12 and of a data station 36 of a data processing system 37. In the same manner, a receive line 39 is connected in parallel to all similar connections on the other data stations. A common return line 41 likewise connects all similar connections of the aforementioned devices. A record line 42 connects the similar busy-signal connections of the data stations 33 and 34.

Via the keyboards 29 and 31 and the position indicators 26 and 27, a data-exchanging connection can be established with the data processing system 37.

Figure 2:
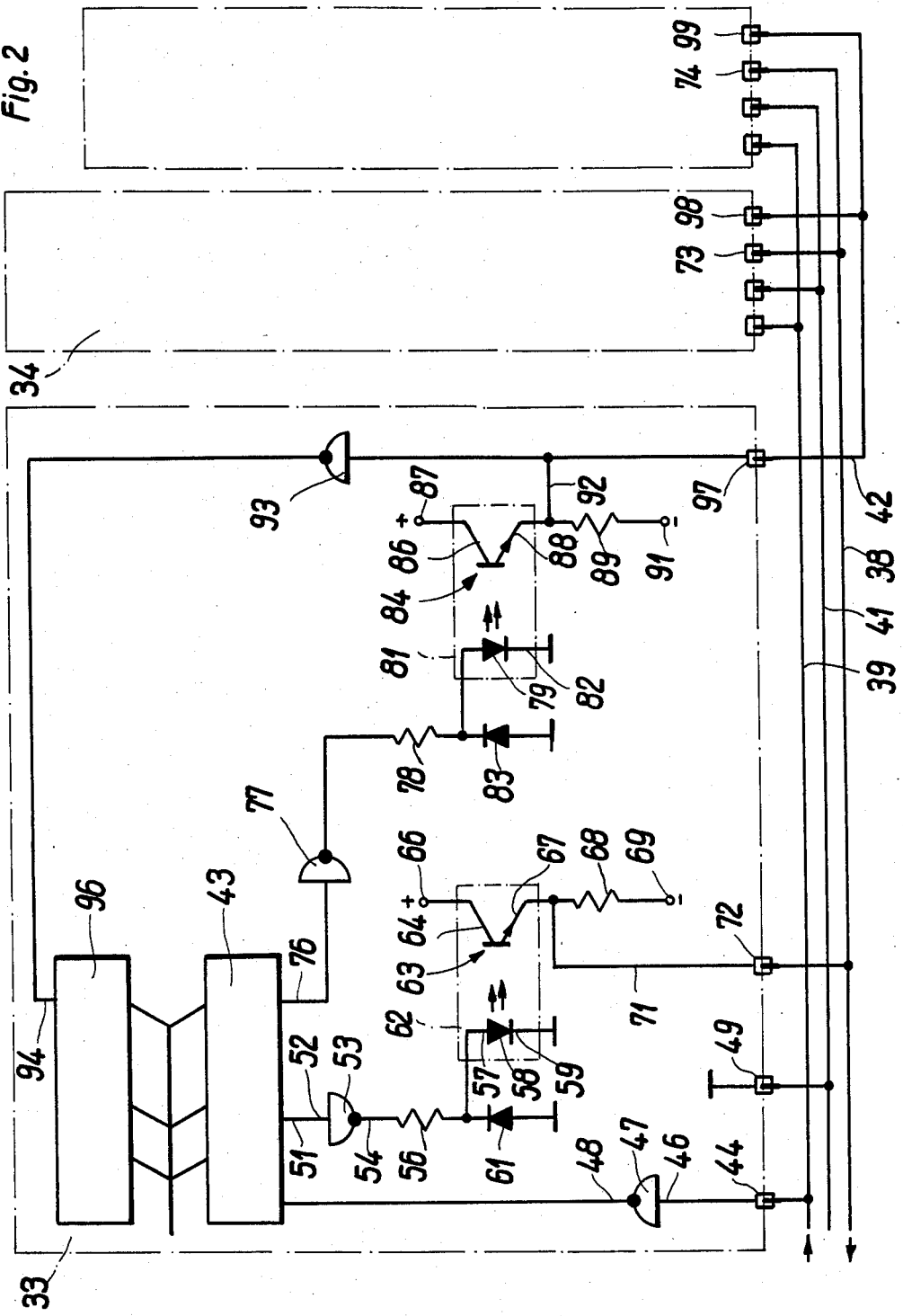
FIG. 2 shows a circuit diagram of a control arrangement according to the invention, in which, however, details known per se have been omitted or are shown in a diagrammatically simplified manner.

FIG. 2 shows details of the data station 33. It is provided with a circuit element 43 formed by a microprocessor. A receive line 39 leads via a pin 44 of a connector strip to a connection 46 of a NAND gate 47, the output 48 of which is connected to the circuit element 43. The return line 41 leads via a pin 49 of a connector strip to a circuit board and is connected there in a known manner to all circuit points representing system earth.

A signal output 51 of the circuit element 43 is run to a connection 52 of a NAND power driver 53. The output 54 of this driver is connected to one side of a resistor 56. The other side of the resistor 56 leads to a connection 57 of a light-emitting diode 58, the other connection 59 of which is connected to system earth. A protective diode 61 is connected in antiparallel with the diode 58. 62 is an optical coupler. Its housing contains, closed off against surrounding light, a transistor 63 designed as a phototransistor. Optical couplers of this type are commercially available. The collector 64 of the npn transistor is connected via a circuit point 66 to the positive terminal of a 12-Volt voltage source. The emitter 67 of the transistor 63 is connected via a resistor 68 and via a circuit point 69 to a potential of $-12$ Volts. The resistor 68 can be of approximately 47 kOhm. The transistor 63 is thus operated in an emitter circuit having a high-resistance positive voltage path and thus represents, via a connection 71 and a pin 72, a high-resistance load for the transmit line 38. If a pnp transistor and an operating voltage with reverse polarity is used, this is an emitter circuit having a high-resistance negative voltage path.

The operation of the circuit element 43, its connection to the other circuit elements of the data station 33 and the processing of the data arriving via the receive line 39 and the emission of corresponding data signals at the signal output 51 take place in a very well known manner. The decisive and novel factors are the conditions on the transmit line 38. As shown already in FIG. 1, the transmit line 38 connects similar signal outputs. Accordingly, it leads to a pin 73 of another data station 34 and also to a similar pin 74 of another data station indicated diagrammatically. These signal outputs are connected to optical couplers in the manner described before. The following action takes place: if an H signal is present at the signal output 51, the NAND power driver 53 inverts the signal and no current flows through the diode 58. The transistor 63 is then of high resistance and $-12$ Volts are present at pin 72 via the resistor 68. In the same manner, $-12$ Volts should also initially be present at pins 73 and 74. If data are now sent by the circuit element 43 to the data processing system, this means that the signal at the signal output 51 alternates between H and L. Accordingly, the diode 58 is alternately supplied with positive or negative voltage. In intervals with positive voltage, it emits light (predominantly in the infrared range) which makes the transistor 63 of low resistance. In this condition, it forces the positive potential present at the circuit point 66 also to appear at pin 72. The potential on transmit line 38 thus alternates from +12 Volts to −12 Volts in the rhythm of the drive signal. As a result of the high-resistance circuits in the other data stations, this jump in potential can take place without short-circuit effects.

This makes it clear that each data transmission device can operate on the transmit line. Of course, it must be prevented that several stations are sending simultaneously. If the response/acknowledgement cycle is exclusively controlled by a central data processing system, this will dictate the discipline required. Should it be possible, however, also to direct requests individually from each control arrangement to the central data processing system, the data stations must receive a busy signal which is analysed by them in very well known manner, ensuring thereby that only one station at a time ever emits signals.

In order to avoid the interposition of a multiplexer in this case as well, a busy signal output 76 of the circuit element 43 is connected via a NAND power driver 77 used for matching purposes and a resistor 78 to a light-emitting diode 79 of another optical coupler 81. The other end of this diode 79 is connected to system earth. A protective diode 83 is connected in antiparallel with this diode. The collector 86 of an associated transistor 84 which is likewise designed as a phototransistor is connected to a circuit point 87 at which +12 Volts are present. The emitter 88 of the transistor 84 is connected via a resistor 89 to a circuit point 91 at which −12 Volts are present. The resistor 89 has 47 kOhm. From the emitter 88, a connecting line 92 leads via a NAND gate 93, used for matching purposes, to a busy signal input 94 of a further circuit element 96 designed as a microprocessor and associated with the data station. The connecting line 92 also leads to a busy-signal connection 97, formed by a pin, from which the record line 42 leads to busy-signal connections 98 and 99 of the other data stations.

This circuit operates as follows:

If an H signal is present at the busy-signal output 76, the diode 79 does not emit any light and the transistor 84 is of high resistance. At the record line 42, therefore, −12 Volts are present. This state is inverted via the NAND gate 93 and the output signal of this gate indicates to the circuit element 96 that no data station is sending. In similar manner, the line state in the other data stations is analysed, for example in data station 34. However, as soon as data station 33, for example, wants to emit signals in the previously described manner to the transmit line 38, the circuit element 43 generates at its busy-signal output 76 an L signal which is converted by the NAND power driver 77 into a positive voltage, for example 12 Volts. The diode 79 thus emits light and the transistor 84 becomes low resistant. In this way, it forces the positive voltage present at circuit point 87 to be impressed via the connecting line 92 and the busy-signal connection 97 on to the record line 42.

Here again, this potential jump can be set up without short-circuit effect.

The busy signal is analysed by the circuit element 96 in the generally known manner.

Figure 3:
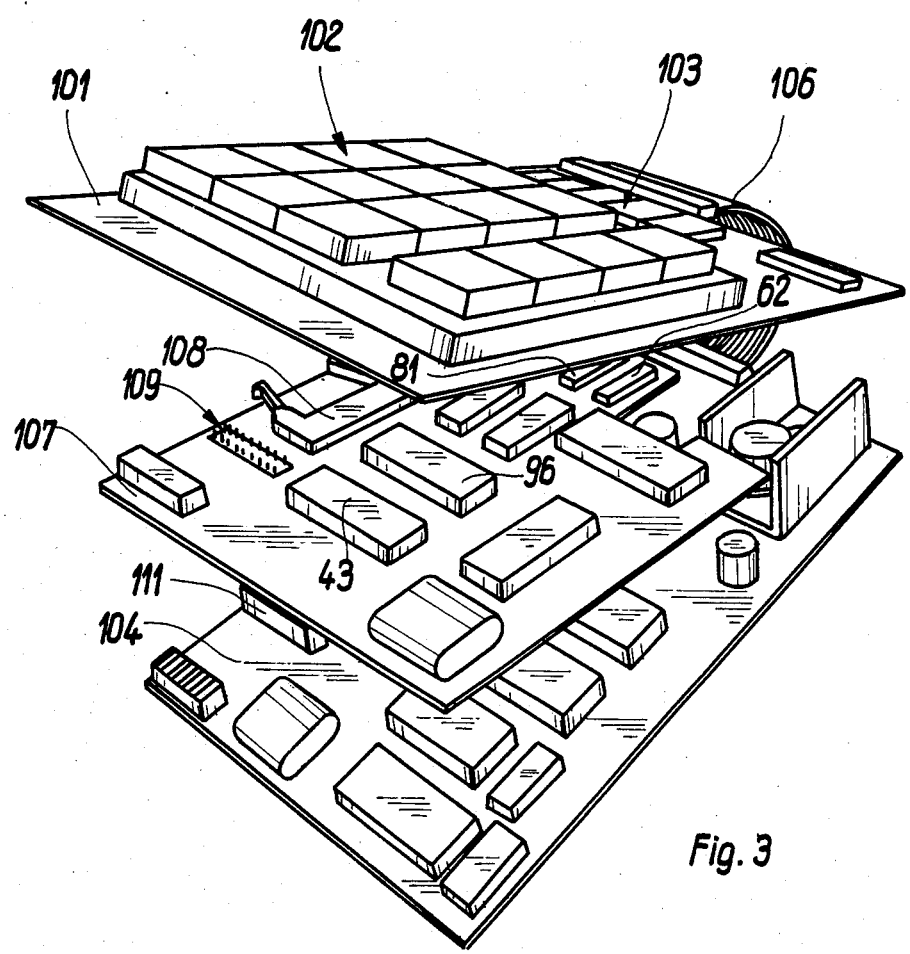
FIG. 3 shows a perspective view of the control arrangement according to the invention which is also shown as a simplified drawing.

A particularly suitable layout of the control arrangement is shown in FIG. 3. The Figure is intended only to illustrate the most essential features and therefore shows the individual circuit elements in a diagrammatically greatly simplified form. On a first circuit board 101, an input unit 102 and an optical indicating unit 103 and the associated circuits are accommodated. The electrical connection is made in the known manner on the rear of the board 101 by means of printed circuit tracks. The input unit 102 essentially comprises a keyboard and the indicating unit 103, an approximately five-digit numerical display. This makes it possible to display position coordinates, the currently most important data being indicated in chronological sequence in each case, for example, the carrier number and the position of the desired item of stored goods on the carrier and then the number of items to be removed or the remaining number of items.

In addition, another circuit board 104 is present which essentially carries the circuits of the control logic and of the data terminal. The first circuit board 101 is connected to the second circuit board 104 via a multiple ribbon cable 106. Between these two circuit boards, a third circuit board 107 is located which essentially carries the circuits of the data transmission device. For guidance, the circuit elements 43 and 96 and the optical couplers 62 and 81 are provided here with the corresponding reference symbols. On the third circuit board 107, a connector strip 108 is located into which a female multipoint connector, not specially shown, can be inserted which brings the lines 38, 39, 41 and 42 to the board. On the third circuit board 107, in addition, a connector strip 109 is mounted which is here visible only from the solder side and the pins of which point downward in the Figure towards the second circuit board 104 and can be inserted into a female multipoint connector 111 mounted at that location.

This exploded view of FIG. 3 is for better clarity of representation. In the installed condition, all three circuit boards are kept parallel to each other and spaced apart from each other. However, the third circuit board 107 can be exchanged without great difficulty. If, or example, it is not necessary to connect several control arrangements together, a circuit board can be inserted on which the circuit elements no longer necessary are then missing. The missing parts would then be, for example, the two optical couplers 62 and 81, the circuit element 96 and an integrated circuit element containing several NAND gates no longer required.

This consideration shows clearly that the extra effort required to be able to connect several control arrangements in parallel is practically of no great significance. In the total data transmission path, only one data transmission device must be passed in each case namely that of the transmitting data station. In contrast, the use of a multiplexer would insert an additional data transmission device in the transmission path. The invention thus considerably reduces the risk of interference.

FIG. 3 shows approximately to scale the combination of a keyboard and a display unit having practically the most essential circuit elements of a control arrangement. Only the power control unit for the drive system is best accommodated separately. On the basis of FIG. 3, it can be seen that the diagrammatic layout of FIG. 1 was largely only to allow the line run to be shown in a graphically clear manner.

The control arrangement described also makes it possible to couple together, for example, two or three control arrangements without including a data processing system. Such an arrangement is not specially shown since it is obtained simply by omitting the data processing system. The decisive factor for such a mode of operation is that the carriers of the individual systems of circulating shelving are numbered continuously, which must be taken into consideration in coding the positions of parts. One system of circulating shelving acts as a continuation of the preceding one, as it were, just displaced in space.

In the previously explained system, the data processing system always selects in each case one of the multiplicity of systems of circulating shelving connected and it is obvious, therefore, that the code number of each item of stored goods specifies not only at which position of which carrier it can be found but also to which system of circulating shelving it is allocated. The data processing system thus initially sends out the identification number of the relevant system of circulating shelving. Each data terminal of the system, therefore, must be programed in such a way that it recognises its own identification number and then indicates to the data processing system that it is ready for further data exchange.

I claim:

1. Control arrangement for circulating shelving having at least first (11) and second (12) systems of circulating shelving, each of said systems of circulating shelving being controlled by a data processing system and having a plurality of carriers for storing goods, said carriers being moved by a drive system, means for detecting the position of said carriers, means for detecting the occupancy of said carriers, and a data station having a data terminal and a data transmission device, said data station (33) of said first system being connected via a receive line (39), a transmit line (38) and a return line (41) to the data station (34) of said second system and to a data station (36) of the data processing system (37), said receive line being connected to a signal input of the data terminal of said first system, said transmit line being connected to a signal output of the data transmission device of the first system, and said return line being connected to the ground of the data station of the first system, and a first transistor driven by the signal output of the data transmission device of said first system, said first transistor being operated in an emitter circuit having a high resistance voltage path, said transmit line being connected to the emitter of said first transistor.

2. Control arrangement aecording to claim 1, characterised in that the transistor (63) which can be connected to the trnsmit line (38) is a component of an optical coupler (62) having a light-emitting diode (58) which is connected to the signal output (51).

3. Control arrangement according to claim 2, characterised in that the signal output (51) is coenected via a NAND power driver (53) to the light-emitting diode (58).

4. Control arrangement according to claim 1 or 2, characterized in that the data station (33) of the first system of circulating shelving (11) is provided with a busy-signal connection (97) which is connected via a connecting line (92) to a busy-signal input (94) of a circuit element (96) and to an emitter (88) of a further transistor (84) which is operated in an emitter circuit forming part of said busy-signal circuit and also having a high resistance viltage path, said transistor (84) being driven by a busy-signal output (76) of another circuit element (43) of the data station (33) of the first system of circulating shelving (11) in which arrangement it is possible for the busy-signal connection (97) to be connected via a reocrd line (42) to at least one similar busy-signal connection (98) of the data station (34) of the second system of circulating shelving (12).

5. Control arrangement according to claim 4, characterized in that further transistor (84) which can be connected to the record line (42) is a component of a further optical coupler 81 having a further light-emitting diode (79) which is connected to the busy signal output (76) of the data station (33) first system of circulating shelving.

6. Control arrangement according to claim 5, characterized in that the busy-signal output (76) is connected via a NAND power driver (77) to the further light emitting diode (79) of the further optical coupler (81).

7. Control arrangement to claim 1, characterized in that it is provided with three circuit boards (101, 104, 107) of which the first (101) and the second (104) are connected to each other via a multiple ribbon cable (106) and of which the third (107) is provided with a connector strip (108) having a pins which can be inserted into a corresponding female multipoint connector (111) on the second (104) circuit board.

8. Control arrangement according to claim 7, characterized in that the first circuit board (101) carries an input unit (102) and an optical display unit (103) and associated circuits, the second circuit board (104) carries circuits for control logic and the data terminal, and the third circuit board (107) carries circuits of the data transmission device.

9. Control arrangement according to claim 8, characterised in that the three circuit boards (101, 104, 107) are kept parallel to each other and apart from each other, the third circuit board (107) being located between the first circuit board (101) and the second circuit board (104).

10. Control arrangement according to claim 7, characterised in that at the third circuit board (107) a female multipoint connector is insertable which brings the lines (38, 39, 41, 42) to other data stations (34).

11. Control arrangement according to claim 10, characterised in that the three circuit boards (101, 104, 107) are kept parallel to each other and apart from each other, the third circuit board (107) being located between the first circuit board (101) and the second circuit board (104).

12. Control arrangement according to claim 7, characerised in that the three circuit boards (101, 104, 107) are kept parallel to each other and apart from each other, the third circuit board (107) being located between the first circuit board (101) and the second circuit board (104).

* * * * *

UNITED STATES PATENT AND TRADEMARK OFFICE
CERTIFICATE OF CORRECTION

PATENT NO. : 4,618,932
DATED : October 21, 1986
INVENTOR(S) : Hans-Peter Sauer

It is certified that error appears in the above-identified patent and that said Letters Patent are hereby corrected as shown below:

Claim 2, Line 1: Delete "aecording", and substitute -- according --.

Claim 2, Line 3: Delete "trnsmit", and substitute -- transmit--.

Claim 3, Line 2: Delete "conencted", and substitute -- connected --.

Claim 4, Line 9: Delete "viltage", and substitute -- voltage --.

Claim 4, Line 14: Delete "reocrd", and substitute -- record --.

Claim 7, Line 1: After "arrangement", add -- according --.

Claim 12, Lines 1-2: Delete "characerised", and substitute -- characterised --.

Signed and Sealed this

Twenty-seventh Day of January, 1987

Attest:

DONALD J. QUIGG

Attesting Officer     Commissioner of Patents and Trademarks